United States Patent [19]
Hamilton et al.

[11] 3,818,307
[45] June 18, 1974

[54] SERIALLY-CONNECTED CONVERTERS HAVING MULTIPLE REGULATION MODES FOR USE IN SUPPLYING SERIALLY-CONNECTED LOADS ON LONG LINES

[75] Inventors: Billy Harold Hamilton, Summit; John Robert Meszar, Parsippany; Roman Ostapiak, Pine Brook; Robert Edward Schroeder, Parsippany; Peter Pentti Untamo, Branchburg Twp., Somerset County, all of N.J.

[73] Assignee: Bell Telephone Laboratories, Incorporated, Murray Hill, N.J.

[22] Filed: July 31, 1972

[21] Appl. No.: 276,708

[52] U.S. Cl................. 321/11, 179/170 J, 307/82, 321/19, 321/27 R, 323/20, 323/23
[51] Int. Cl.......................... H04b 3/58, H02m 3/32
[58] Field of Search.............. 307/58, 82; 321/2, 11, 321/18, 19, 27 R; 323/20, 23

[56] References Cited
UNITED STATES PATENTS

| | | | |
|---|---|---|---|
| 3,356,930 | 12/1967 | Lupoli et al. | 323/20 |
| 3,414,803 | 12/1968 | Glasgow et al. | 321/19 X |
| 3,566,143 | 2/1971 | Paine et al. | 323/20 X |
| 3,585,491 | 6/1971 | Petersen | 321/2 X |
| 3,675,037 | 7/1972 | Hamilton | 321/27 R |

*Primary Examiner*—A. D. Pellinen
*Attorney, Agent, or Firm*—Wilford L. Wisner

[57] ABSTRACT

These serially connected converters have multiple regulation modes including a new normal mode in which the current-versus-voltage characteristic has a substantial negative slope. This mode produces better load sharing among the serially connected converters than would a constant-current mode of operation and provides more stable operation of the remote repeaters serially supplied along a communication line by the converters than would a constant-voltage mode of regulation of the converters, especially in the presence of disturbances on the line. In the event that a converter is turned on into a line presenting an abnormally high load impedance, the converters are shut down. In the dual-line communication link, the neutral point at the floating end is grounded in the presence of sufficient voltage inbalance and then is ungrounded when the line currents are near balance.

6 Claims, 4 Drawing Figures

SERIALLY-CONNECTED CONVERTERS HAVING MULTIPLE REGULATION MODES FOR USE IN SUPPLYING SERIALLY-CONNECTED LOADS ON LONG LINES

BACKGROUND OF THE INVENTION

This invention relates to the regulated converter type of power supply and to arrangements for feeding power to loads serially connected on a long line, for example, a communication line.

In many power supply systems, converter circuits are used to convert an input dc voltage at one level to an output dc voltage at a different level. For many applications, the output voltage level is regulated to be substantially constant.

Nevertheless, there exist applications in which a constant output current from the converter has been found to be advantageous. A typical case of this type is found in wired communication links in which the signal repeaters are widely separated along a long line and, because of the remoteness of one or more of them from local power sources, are supplied serially by a current flowing along this line.

In such a link, variations in temperature and other disturbances can cause a change in the voltage drops along the line, so that a constant current supplied from one end of the line is more likely to supply adequate bias to every repeater than is constant voltage supplied at that end.

In very long links, a likely arrangement includes two one-way lines and at least four converters, at least two at each end, connected in series-aiding polarity in a loop with the lines. The midpoint of one pair is typically grounded to balance the system to ground and thus minimize the voltages between the lines and the ground.

With a plurality of converters in series, the constant-current mode of regulation has the disadvantage that, if their output currents are not accurately balanced, one converter tends to take over and supply all of the load power. This result occurs because the feedback regulatory circuits of the converters are trying to maintain inconsistent operating currents and are ultimately driven to extreme conditions of output voltage.

In prior art converters of this type, provision has been made to switch a converter from a constant current to a constant voltage mode of regulation when its output voltage reaches a selected high value. At the time of switch-over, a long link may be unduly unbalanced to ground and will remain so.

It is an object of our invention to supply adequate power to all serially connected loads while maintaining a suitable balance among the converters.

SUMMARY OF THE INVENTION

According to our invention, the foregoing object is achieved by providing each converter with multiple regulation modes including a new moral mode in which the output current-voltage characteristic has a substantial linear negative slope. Beyond the high current limit of this normal mode there is provided a substantially constant current mode of regulation; and beyond the high voltage limit of the normal mode there is provided a substantially constant voltage mode of regulation.

According to a subsidiary feature of our invention, there is provided converter shut-down responsive to turn-on conditions including an abnormally high load impedance or open line.

According to another subsidiary feature of our invention, the floating neutral of a long link balanced to ground is automatically grounded under conditions of excessive voltage to ground and is automatically ungrounded when the converter currents to the neutral point are sufficiently rebalanced.

BRIEF DESCRIPTION OF THE DRAWING

Further features and advantages of our invention will become apparent from the following detailed description, taken together with the drawing, in which.

DESCRIPTION OF ILLUSTRATIVE EMBODIMENT

Figure 1:
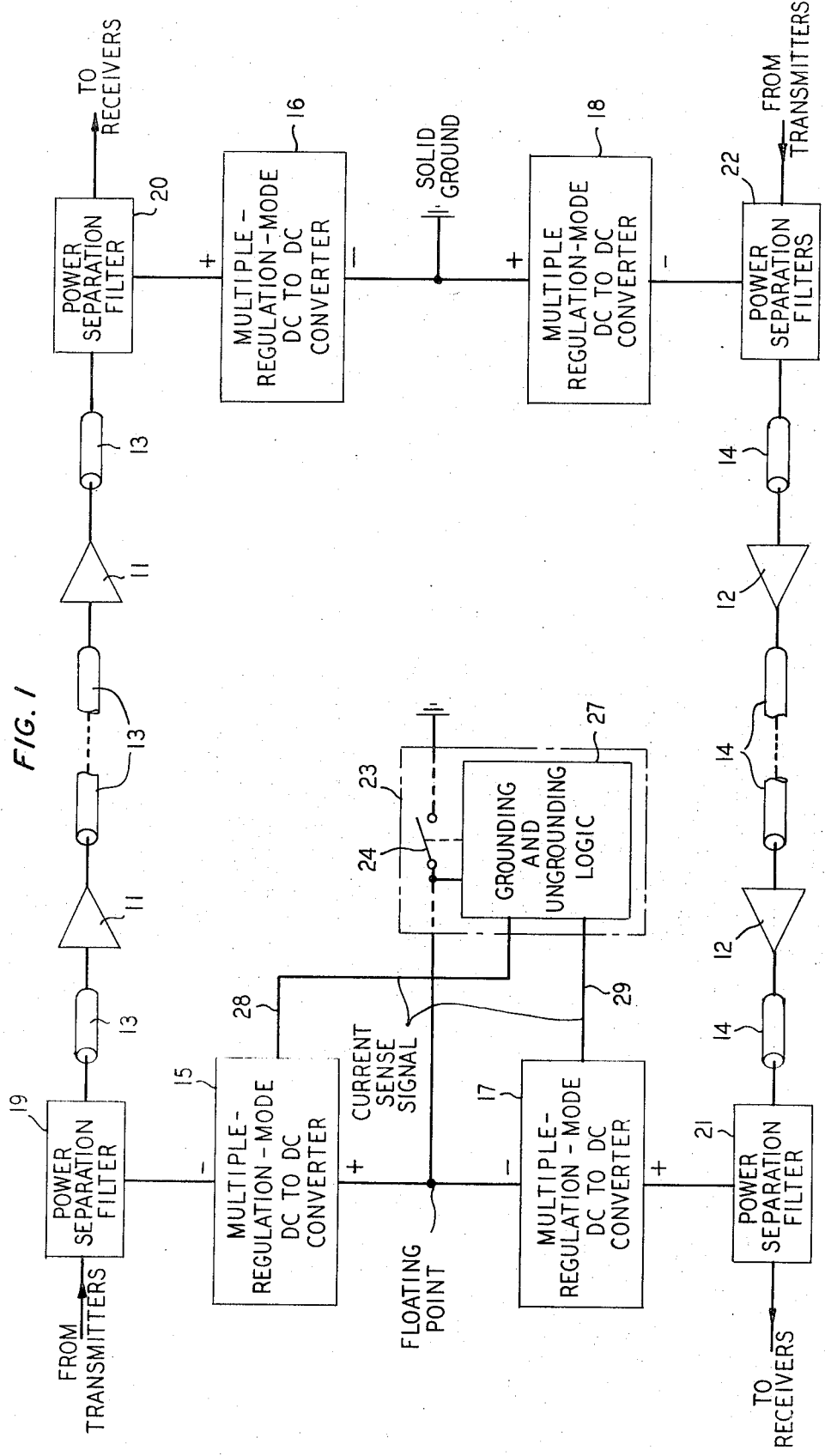
FIG. 1 is a schematic and block diagrammatic illustration of a communication link employing converters according to the invention and automatic grounding according to one subsidiary feature.

The typical function of a power supply system of the type illustrated in FIG. 1 is to furnish dc power to repeaters, such as the oppositely directed repeaters 11 and 12 in a long link type of communication system. The system typically uses coaxial cables 13 and 14 for propagation of the signals between repeaters 11, for the one direction of signal propagation, and between repeaters 12, for the other direction of signal propagation, respectively.

For a link of relatively great length, converters 15 and 16 would be connected serially in a loop with cable 13 and repeaters 11, the converters being at opposite ends of the link. This arrangement minimizes direct-current voltages to ground because the voltage drops of the repeaters are between the two converters. In a shorter link, one of these converters could be eliminated. For the moderate-to-long link, a converter 18 will be used in series with converter 17 and repeaters 12 and cable 14 to minimize the dc voltages to ground in the second half of the link.

The two halves of the communication link are always balanced to ground, for example, by connecting a converter 17 serially with converter 15 and in a loop with the repeaters 11 and 12 and cables 13 and 14, so that the midpoint between converters 15 and 17 is neutral, or near ground potential when the corresponding point between converters 16 and 18 at the other end of the link is solidly connected to ground, as shown.

The converters 15 through 18 are connected to the respectively adjacent sections of cables 13 and 14 through power separation filters 19 through 22 in a manner that is conventional and very well known in the art. The power separation filters also combine with or separate from the dc current the signal propagating from transmitters (not shown) or to receivers (not shown) in a manner well known in the art.

Each of the converters 15 through 18 is a multiple regulation mode converter according to the invention, as will be described in more detail hereinafter. Each supplies a nominal value of regulated current at a nominal value of regulated voltage, with the difference from prior art regulated converters that in the normal regulation mode both the current and the voltage are allowed to vary with a prescribed negative slope in order to maintain adequate power to each of the repeaters 11 and 12, while providing balanced load sharing among the converters 15 through 18. Moreover, beyond the limits of the normal regulation range, each converter has respective constant current and constant voltage regulation modes with a sharply defined automatic switch-over that is intended to carry out the general philosophy of the invention in such a system.

Of particular note with respect to FIG. 1 is the feature related to unexpected inbalance in the two-way four-wire coaxial cable system shown. If a disturbance so affects just one-half of the link that the floating point between converters 15 and 17 deviates substantially in voltage from ground, a grounding and ungrounding circuit 23 is activated to ground the floating point by closing switch 24. For this purpose a voltage sense signal is generated within grounding circuit 23, as will be seen hereinafter.

In the operation of the grounding circuit 23, once the floating point has been connected to ground, the voltage inbalance in the two halves of the link will cause a current to flow through the ground return path, which may include the cable sheaths, to the grounded point between converters 16 and 18. It is this current which allows the floating point to be held to ground potential.

Nevertheless, this current produces the substantial disadvantage of corrosion of the cable sheaths or other ground connections. In order to minimize this corrosion, the floating point is automatically ungrounded once a reasonable state of balance is restored.

The return of a potentially balanced state is sensed by sensing the currents flowing to and from the floating point from and to converters 15 and 17, respectively, via current sense signals supplied to logic circuit 27 through connections 28 and 29 from converters 15 and 17, respectively.

Optionally, for the preferred case in which converters 15 through 18 include so-called "soft-start" capabilities, the floating point also remains grounded during the converter turn-on until the output currents of both converters are up near nominal value and reasonably well balanced.

Further details of specific grounding and ungrounding circuitry 23 are disclosed hereinafter in connection with FIG. 4.

Figure 2:
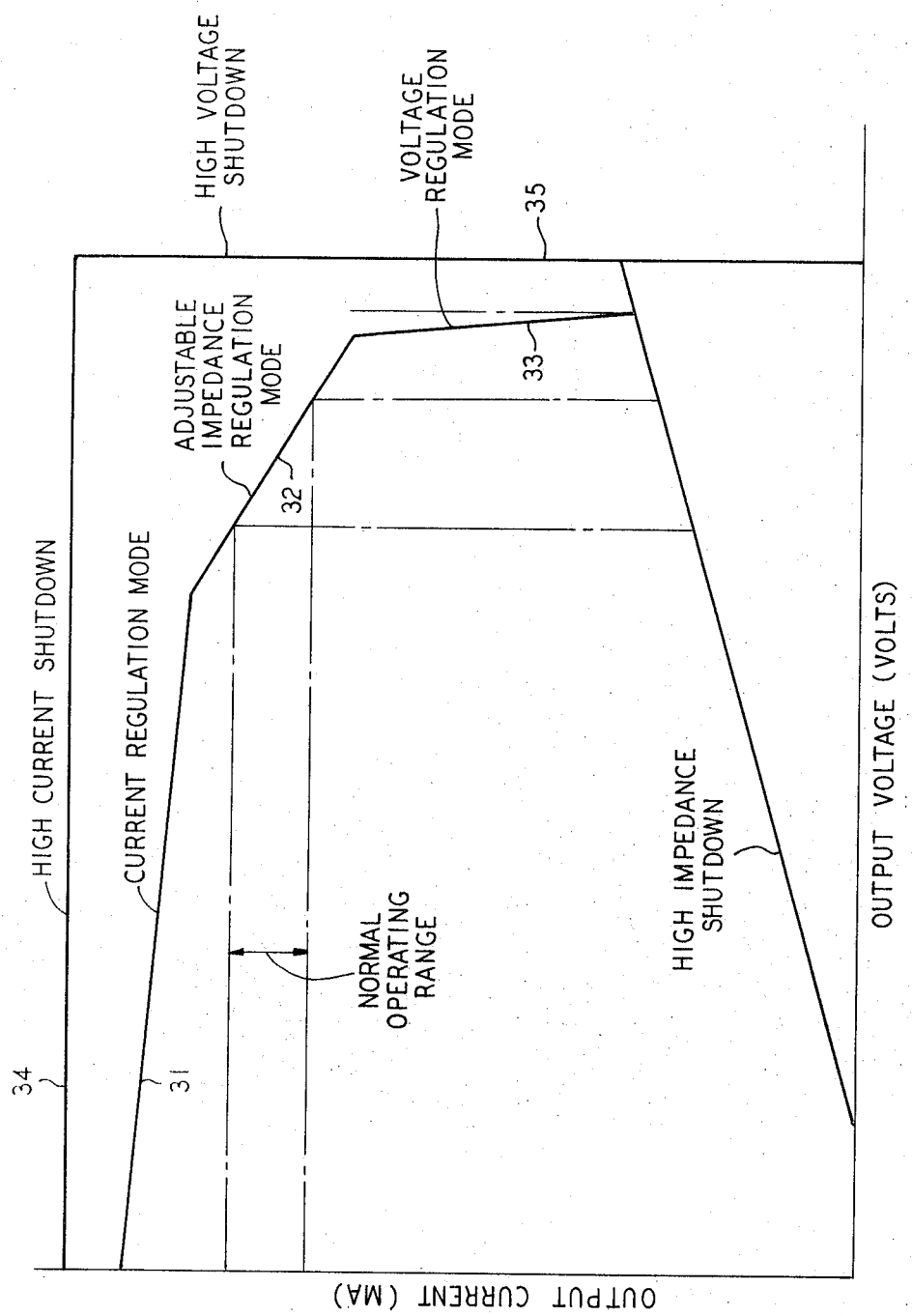
FIG. 2 shows curves representing the regulation characteristics of the invention.

In FIG. 2 are shown curves which illustrate theregulation modes employed in each of the converters 15 through 18, according to the invention. The feedback regulator in each converter controls the width of the base current pulses of switching transistors in an inverter circuit to be described hereinafter and thereby the output of the converter in such a manner that the output current-voltage characteristic of the converter exhibits three segments 31, 32 and 33, as shown in FIG. 2. The normal regulation mode is represented by the segment 32 having substantial negative slope. Segment 32 may also be called the adjustable impedance regulation mode.

At the high current limit of the normal mode there is an abrupt switch-over to the current regulation mode, labeled as segment 31 in FIG. 2. As compared to the normal mode, the current regulation mode may be called a substantially constant-current mode.

At the higher voltage limit of the normal regulation mode, which is also its lower current limit, there is an abrupt switch-over to a voltage regulation mode represented by segment 33 in FIG. 2. The voltage regulation mode, as compared to the normal mode, may be termed a substantially constant-voltage regulation mode.

Thus, it may be seen that a converter according to the invention has three distinct modes of regulation. In the voltage regulation mode, the feedback regulator responds to and controls the output voltage of the converter. The converter is a voltage source when the load impedance is substantially higher than normal. In the current regulation mode, the feedback regulator responds to and controls the output current of the converter. The converter is a current source when the load impedance is substantially lower than normal. In the normal or adjustable impedance mode, the feedback regulator responds to both output voltage and current of the converter. This mode of operation typically corresponds to a normal range of load impedance. The limits of this mode are selectable parameters which are chosen in a particular case to insure the achievement of the objectives outlined above. The combination of current and voltage feedbacks in this normal mode of regulation gives the optimum output characteristics for the normal operation, considering that the current feedback tends to maintain the output current at its selected level and the voltage feedback tends to maintain the output voltage of its converter at its selected level in the absence of unexpected disturbances, thus guaranteeing proper balance amoung the converters and proper biases in each of the repeaters 11 and 12.

Figure 3:
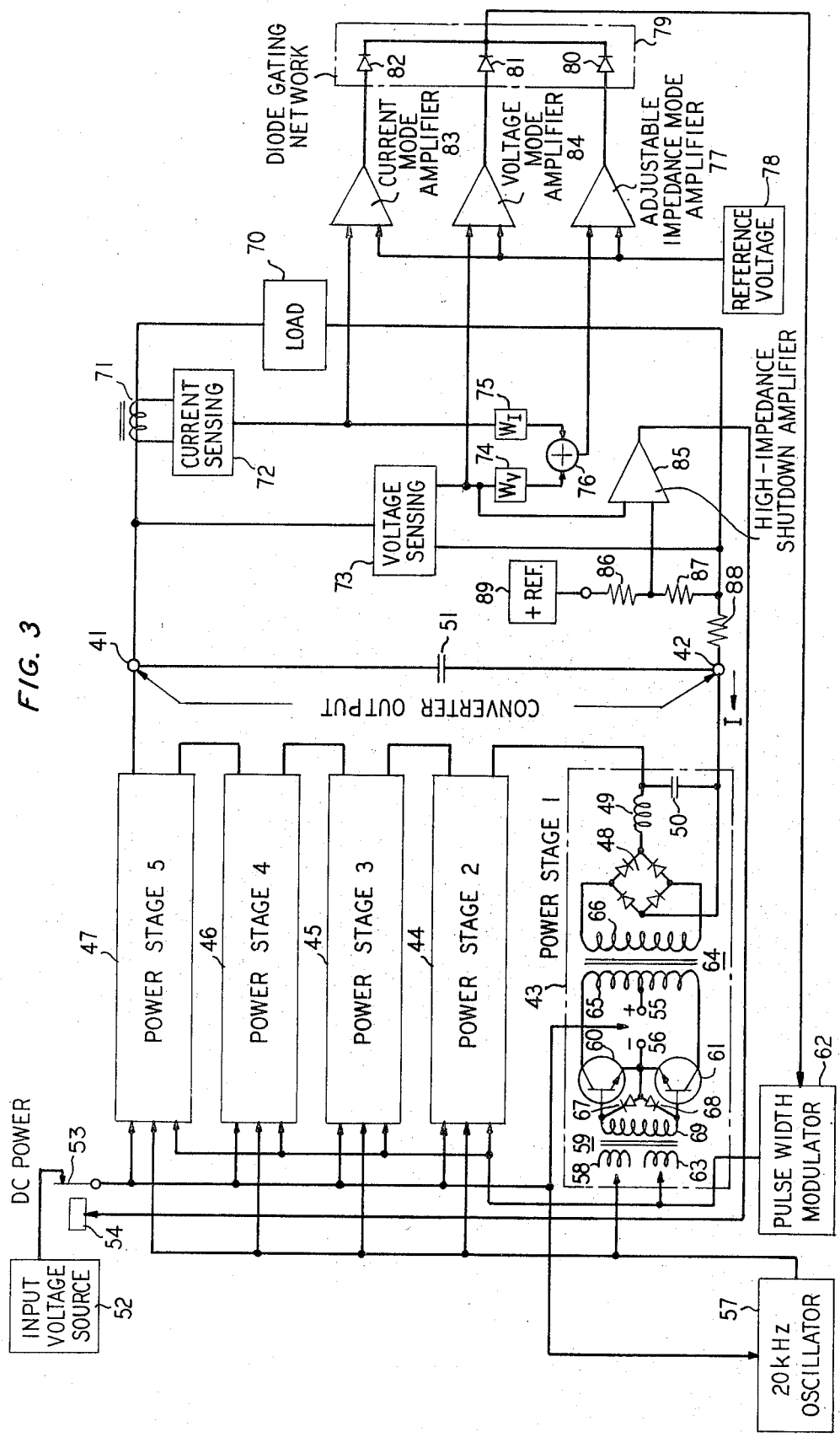
FIG. 3 shows one illustrative embodiment of a regulated converter according to the invention.

In FIG. 3 there are shown the relevant features and interconnections of the circuitry of a converter according to the invention. Depending upon the length of cable to be powered, the output voltage requirements of the converter vary considerably. For reasons of economics and also in order to limit the fault current to the load connected to output terminals 41 and 42 in the case of a malfunction of the circuit, the converter is provided with 1, 2, 3, 4 or 5 power stages 43 through 47 as shown, each of like output capabilities. Specifically, the output rectifier circuits, including full wave rectifiers such as rectifier 48, filter inductor 49 and filter capacitor 50, are interconnected with the output filter capacitors all in series between terminals 41 and 42. A final output filter capacitor 51 may be connected between terminals 41 and 42. It is generally desirable that all of the power stages be interchangeable.

The dc input voltage for power stages 43 through 47 is supplied from a source 52 through a switch 53 shown normally closed and controlled by the shut-down relay 54 so that the input voltage is applied between terminals 55 and 56 in each inverter circuit in the polarity indicated to energize the inverter circuit in a balanced fashion. The input voltage is also applied to a fixed frequency oscillator 57 which drives the inverters of the power stages. Specifically, a fixed frequency signal, for example, at 20 kilohertz, is supplied to the inverter through a winding 58 of a transformer 59 in the drive circuits for the inverter transistors 60 and 61. The width of each half-cycle effective to supply power through the inverter is controlled by a pulsewidth modulator 62 driven by the feedback regulator circuitry, to be described hereinafter, and connected to another winding 63 of transformer 59. Similar connections of input voltage source 52, oscillator 57 and pulsewidth modulator 62 are made to each of the other power stages 44 through 47.

More specifically, in power stage 43 the transistor inverter includes the power transformer 64 having a center tapped primary winding 65 with center tap connected to the positive terminal of course 52, and a secondary winding 66 connected to rectifier 48. The positive terminal of the rectifier bridge is connected to filter inductor 49. The inverter transistors 60 and 61 have their collectors connected to the end terminals of the primary winding 65 and have their emitter terminals connected together to the negative terminal of source 52. Their base leads are connected to opposite terminals of the secondary winding of the transformer 59. Diodes 67 and 68 are connected in reverse polarity across the base emitter junctions of transistors 60 and 61.

Each of the power stages 43 through 47 receives its base drive from oscillator 57 in the form of a constant amplitude square wave ac current applied to winding 58 of transformer 59.

Whenever transistor 60 is not conducting, the current in secondary winding 69 of transformer 59 is in phase and proportional to the current flowing in winding 58. If current flows from the upper terminal of winding 69 through the base of emitter junction of transistor 60 and through diode 68 back to the other terminal of winding 69, transistor 60 receives forward base current and is in an "on" state. The forward voltage drop of diode 68 keeps transistor 61 in an "off" state. During the next half-cycle of the base current drive from oscillator 57, the "on" and "off" states of transistors 60 and 61 are reversed.

During each half-cycle of base current, after a time interval determined by the regulator circuit, as described hereinafter, transistor 60 or 61, whichever has been conducting, is switched to an "off" state for the remainder of the half-cycle.

The pulsewidth modulator 62 is designed with a power transistor output stage of conventional type such that when it is in the "on" state it essentially shorts winding 63 of transformer 59 with a relatively small resistance during the last portion of each half-cycle. This shunting action occurs regardless of the polarity of the voltage from oscillator 57. Due to the mutual coupling of windings 58 and 69 with winding 63, those windings also appear to be shorted. As a result, the diodes 67 and 68 become essentially connected in parallel. Thus the base emitter junctions of transistors 60 and 61 are subjected to substantially the same voltage bias conditions. If forward current has been flowing through diode 67, the diode contains a stored charge with its anode and the common emitter terminals of the transistors positive. Hence, at the time pulsewidth modulator 62 is turned "on," the previously conducting transistor 61 abruptly receives a negative base-to-emitter voltage, since diode 68 experiences substantially the same voltage conditions as diode 67. This negative base emitter bias results in a surge of reverse base current in transistor 61 which quickly removes the charge stored in the base-to-emitter junction of transistor 61. The transistor switches "off" rapidly. The charge stored in the diode 67 is greater than that stored in the base emitter junction of transistor 61 to the extent necessary to insure turn-off of the transistor.

Preferably, an additional resistor (not shown) may be connected from the center tap of winding 69 to the common emitter terminals of transistors 60 and 61 to provide a low impedance path for the collector-to-base leakage currents, to maintain the transistors 60 and 61 "off" when no base current is supplied.

While either of the transistors 60 or 61 is conducting, current flows from source 52 through the respective half of winding 65 and the collector-to-emitter path of the conducting transistor. This pulse of current, starting at the beginning of each half-cycle of the oscillator output current and ending at the turn-on of modulator 62 is transformed by transformer 64 and rectified and filtered to recharge the filter capacitor 50 and ultimately filter capacitor 51 at the output terminals.

The feedback regulator circuitry will now be described. It is convenient for this purpose to show the connections to a load 70 which, of course, are essentially the same as the connections between the converter and its adjacent converter and power separation filter in FIG. 1. The output current of the converter is sensed by a current-sensing circuit including a saturable reactor 71 and suitable amplifying and coupling circuitry 72 for the current-sensing function. The use of saturable reactors for current sensing is well known. Similarly, the output voltage of the converter may be sensed between terminals 41 and 42 by a conventional voltage-sensing circuit 73, which could, for example, be another well-known type of saturable reactor. Each of the resulting current sense signals and voltage sense signals is weighted by appropriate weighting means, for example, suitable amplifiers 74 and 75 of preselected relative gains, which basically determine the negative slope of segment 32 in FIG. 2. The outputs of the weighting means 74 and 75 are added together in adder 76 and applied to the signal input of the adjustable impedance mode or normal mode amplifier 77. There it is compared to a reference voltage or appropriate part thereof, the reference voltage being supplied from a source 78. The output of amplifier 77 is connected to one input of OR gate 79, for example, at the anode of diode 80. Similarly, the output of sensing means 72 is supplied as the signal input to the current mode amplifier 83 where it is compared to an appropriate part of the reference voltage from source 78 and the resulting signal applied to the anode of diode 82 in OR gate 79. The voltage signal means 73 is applied to the signal input of voltage mode amplifier 84 where it is compared with an appropriate part of the reference voltage from source 78 and the resulting signal is applied to the anode of diode 81 in OR gate 79.

In the operation of the feedback regulator, OR gate 79 applies to the input of pulsewidth modulator 62 the largest of its three input signals. The gains in the sensing and feedback circuitry are determined so that the largest signal issues from amplifier 84 throughout the voltage and current ranges between the limits of the normal mode range, as defined by segment 32 of the curve of FIG. 2. These gains then allow the signal from current mode amplifier 83 to become the largest and to become the only signal path to modulator 62 when the high current limit of the normal mode has been passed. Similarly, the output of amplifier 77 becomes the largest and becomes the only signal passed by OR gate 79 to modulator 62 when the high voltage limit of the normal mode, as shown in FIG. 2, has been passed. The signal applied to pulsewidth modulator 62 determines its turn-on time in a manner well known in the art. For example, the feedback signal applied to its input can be compared to a voltage ramp signal to convert the variable amplitude of the feedback signal to a variable time of turn-on, at which time its output transistor is driven to a fully saturated state and shunts the windings of transformer 59. Such comparing techniques are well known in the art.

An additional new feature is provided by the circuitry of FIG. 3. This new feature is termed by us "high impedance shut-down" of the converter. A high impedance shut-down amplifier 85 compares the signal from voltage-sensing means 73 to the signal from a resistance network including resistors 86, 87 and 88. This network supplies a signal which includes a constant voltage reference supplied from a reference source 89 to the upper terminal of resistor 86 by means of a current that flows through all three resistors 86 through 88 in series. This input also includes a component proportional to the output current, since the output current flows through resistor 88. The latter component, proportional to the output current, is important to this shut-down circuit because the circuit has to respond to ratio of voltage and current; i.e., impedance. In fact, "soft start" circuits to provide gradual turn-on are well known in the art; and one of these can be included in pulse width modulator 62.

In operation, it may occasionally happen that the converter is turned-on into an open line. This situation is dangerous to the components of the system, since the output voltage will build up to a destructive level very rapidly. Basically, the output voltage rises too rapidly because the output current is not rising rapidly enough. Therefore, if the output voltage and output current are compared at each moment of time in a way which anticipates whether the probable final voltage will exceed permissible values, then it is predicted very early during the build-up of the output voltage whether load impedance is dangerously high. The circuit we just described responds to the prediction of this condition, namely, relatively large output voltage as compared to output current, by applying a signal from amplifier 85 to relay 54 to open switch 53 and thereby shut down the converter.

Figure 4:
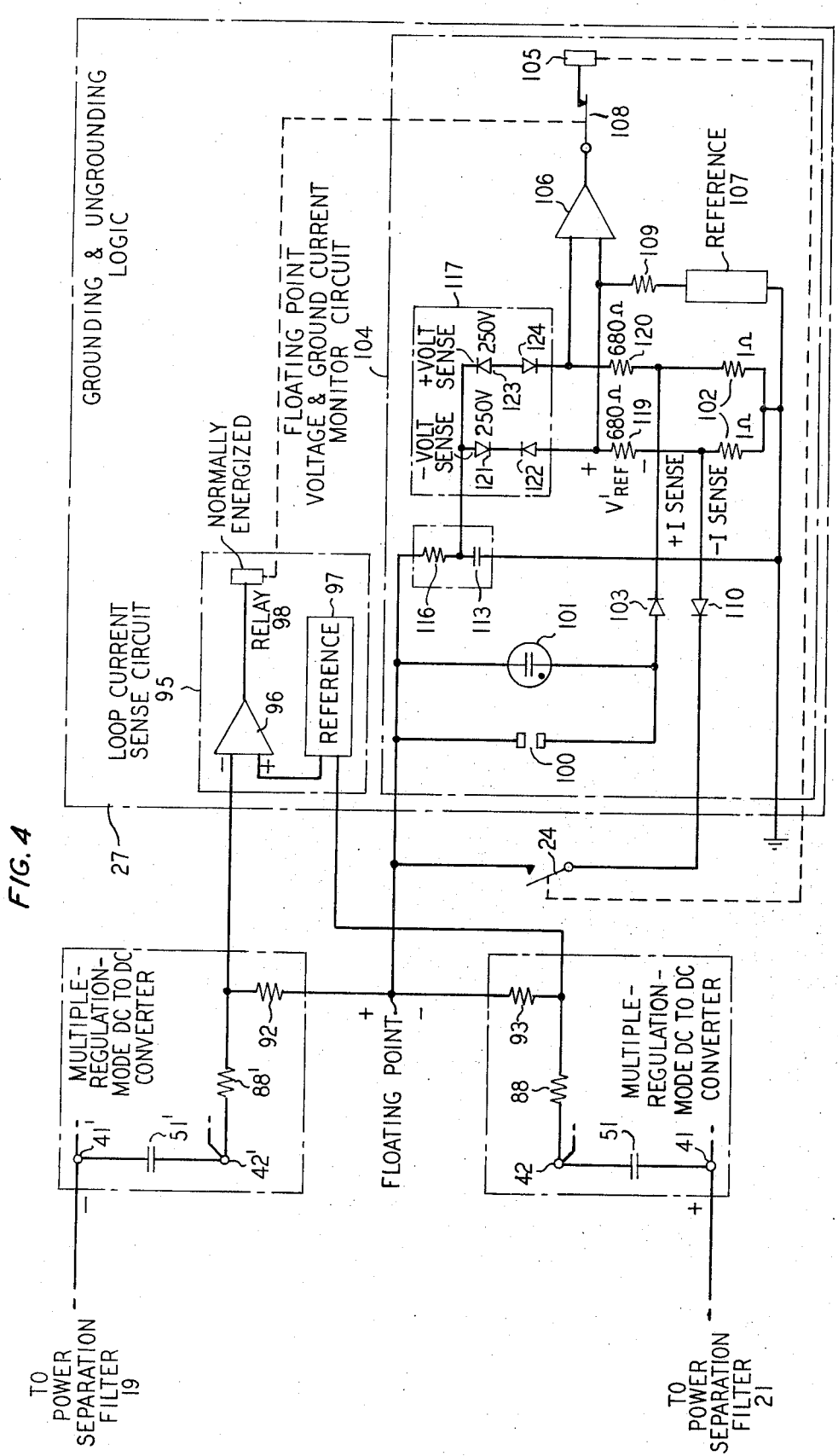
FIG. 4 is a partially schematic and partially diagrammatic illustration of illustrative circuitry for implementing the automatic grounding and ungrounding.

In FIG. 4 there are shown further details of the automatic grounding and ungrounding circuitry. The converter 15 and the converter 16 are connected together through the small series resistors 88', 92, 93 and 88, with the junction of resistors 92 and 93 being the floating point illustrated in FIG. 1. These resistors serve to facilitate the required current-sensing function and limit the surge of grounding current. A loop current sense circuit 95 is connected between the junctions of resistors 88' and 92, on the one hand, and 93 and 88, on the other hand, so that it is effectively connected across the series combination of resistors 92 and 93.

The loop current sense circuit 95 is principally important in automatically ungrounding the floating point after it has been grounded, but also serves an additional function. It includes the input terminals of comparator amplifier 96 and the reference signal source 97 connected serially across the input terminals of sense circuit 95. Comparator amplifier 96 drives a relay 98 to keep relay 98 energized and its contacts 108 in monitor circuit 104 open when the loop current flowing through both of the resistors 92 and 93 in the same sense is above the threshold level. When the loop current falls below the threshold level, relay 98 will be de-energized by comparator amplifier 96; consequently, contacts 108 will open. The floating point will be grounded, through a subsequent sequence of events to be described hereinafter, through contacts 24 of relay 105 and through the small ground current sensing resistor 102.

Conversely, relay 98 will be re-energized when the loop current and the voltage across resistors 92 and 93 has again risen substantially above the drop-out threshold level. Under these conditions, contacts 24 will be reopened and the floating point will be ungrounded.

The automatic grounding circuit includes the carbon block over-voltage protector 100 of known type connected in parallel with the gas tube 101. The gas tube 101 fires more quickly and accurately than carbon block protector 100 and certainly more quickly than the relay circuitry would ground the floating point. In fact, both carbon blocks 100 and gas tube 101 can respond more quickly to the fast high voltage transients than the relay circuitry of monitor circuit 104; and both are set to operate at much higher voltage levels than monitor circuit 104. The carbon blocks 100 provide a more reliable ground connection in the event that the floating point experiences a long term voltage surge from a lightning strike than does gas tube 101.

On the other hand, the monitor circuit 104 is adapted to filter out the fastest transients and respond more slowly but at a much lower and longer duration voltage level to ground the floating point.

The floating point voltage and ground current monitor circuit 104 comprises a comparator-amplifier 106 that drives a normally energized relay 105 to maintain contacts 24 open. The comparator amplifier 106 has applied to its positive input through resistor 109 a reference voltage from reference source 107 adequate to maintain the normally energized condition of relay 105 in the absence of other input signals to comparator amplifier 106. Any of the following conditions operate to de-energize relay 105, closing contacts 24 and thereby grounding the floating point. When relay 98 in loop current sense circuit 95 is de-energized, as explained above, its contacts 108 open and remove voltage from the relay 105 causing it to be de-energized, thereby grounding the floating point when contacts 24 close. To reiterate, this event resulted from an abnormally low loop current, signifying the possible failure of one of the converters in the loop. The grounding of the floating point enables the still operative converters to supply repeaters through a ground return path.

The floating point to ground voltage sensing is accomplished with two series circuits 117 of low leakage avalanche diodes 121 and 123 and rectifier diodes 122 and 124 connected across the output of lowpass filter 113 and 116, the input of which is connected between the floating point and ground.

A positive floating point to ground voltage in excess of the slow-response threshold as determined by filter 113 and 116, and avalanche diode and rectifier circuit 117 produces a positive error voltage with respect to ground across resistor 120. This error voltage, applied to the negative input of comparator 106 is more positive than the reference level on the positive comparator input and causes relay 105 to be de-energized; therefore, the floating point is grounded through contact 24.

A negative floating point to ground voltage in excess of the slow-response threshold achieves the same results via avalanche diode and rectifier circuit 117 producing a negative error voltage across resistor 119 canceling the reference level developed across resistor 109. With the negative input of comparator 106 at zero volts the positive input goes negative with the application of the error signal. The comparator then de-energizes relay 105, causing the floating point to be grounded. The comparator amplifier 106 is maintained normally saturated in the "on" state, energizing relay 105 by applying a positive reference signal from source 107 to divider resistors 109 and 119. A portion of the position reference voltage that is developed across resistor 119 biases amplifier 106 into its "on" state.

It will be apparent that, after the floating point has been grounded, the input signals to comparator amplifier 106 are all removed and that the floating point will be ungrounded when the loop current is sufficient to re-energize relay 98, close contacts 108 and re-energize relay 105 to open contacts 24. This action can be disarmed if, even though the loop current is at a sufficient level, the ground current through the floating point is excessive. This disarming effect is achieved by sensing the ground current flowing through resistor 102. Even when carbon blocks 100 or gas tube 101 are conducting, the small resistor 102 will still carry enough of the ground current when it is objectionably high to turn off operational amplifier 106 and close contacts 24.

It should also be noted that for extremely high current or high voltage conditions in any converter, additional shut-down circuitry can be provided. Such circuitry is conventional. Illustrative limits for the operation of such circuitry are shown by curves 34 and 35 in FIG. 2. Similarly, conventional soft-start circuitry (not shown) is preferably used in each converter in pulse-width modulator 62 to allow it to turn-on gradually and thus to assist the operation of the high impedance shut-down circuitry as well as to reduce stress on the transistor inverter circuit and load. Such soft-start circuitry for use with continuous analog feedback signals is conventional.

We claim:

1. Apparatus comprising a plurality of serially-connected converter circuits and a plurality of loads serially connected with said converter circuits, each of said converter circuits having a feedback control circuit providing additive simultaneous effect and continuous inverse controlled relationship of output current and voltage during the normal mode of regulation of said circuit, each of said circuits having means for providing a plurality of other modes of regulation respectively effective at differing limits of said normal mode.

2. Apparatus according to claim 1 in which the means for providing a plurality of other modes of regulation comprises means for regulating the output current to be substantially constant when the output current rises beyond the high current limit of the normal mode and means for regulating the output voltage to be substantially constant when the output voltage rises beyond the high voltage limit of the normal mode.

3. Apparatus according to claim 2 in which the feedback control circuit includes means for sensing the output current and generating a first signal directly related thereto, means for sensing the output voltage and generating a second signal directly related thereto, means for generating a third signal directly related to the first and second signals, means for comparing said first, second and third signals to selected reference values thereof to generate first, second and third error signals respectively, and means including an OR gate for applying the largest of said error signals of a selected polarity to switch the state of said converter circuit.

4. Apparatus according to claim 3 including means for shutting down each of the converter circuits in response to a fourth signal from any of said converter circuits, means for generating the fourth signal when the second signal related to output voltage exceeds a variable reference signal, and means for generating said variable reference signal as the sum of a constant value and a signal proportional to a fifth signal related to output current, the presence of the fourth signal being indicative of an excessive value of load impedance.

5. Apparatus comprising a source of dc input voltage, a transistor inverter circuit for converting said voltage to an ac voltage at a constant frequency and with zero voltage value during a portion of each half-cycle, means for rectifying and filtering said ac voltage to produce a dc output voltage, and means for varying the zero-voltage portion of each half-cycle, comprising first means for sensing the dc output voltage, second means for sensing the dc output current, means responsive to said first and second sensing means for generating a first signal that varies in direct relationship with said output voltage and in direct relationship with said output current, means responsive to said first sensing means for generating a second signal that varies in direct relationship only with said output voltage, means responsive to said second sensing means for generating a third signal that varies in direct relationship only with said output current, and means including an OR gate coupled between said generating means and said inverter circuit for transmitting the first signal to control the inverter continuously throughout a normal range of said first signal, whereby a continuous inverse relationship between the dc output voltage and dc output current results, and for transmitting to control the inverter whichever of said second or third signals is increasing beyond the respective limits of said normal range.

6. Apparatus according to claim 5 including means responsive to said first sensing means and to additional means for sensing output current for generating a fourth signal that varies according to the difference of a function of the output voltage and a function of the output current, and means for applying the fourth signal to shut down the transistor inverter whenever the fourth signal exceeds a selected limit.

* * * * *